United States Patent [19]

Hedlund

[11] Patent Number: 5,360,298
[45] Date of Patent: Nov. 1, 1994

[54] TOOL FOR CUT-OFF OR SIMILAR TURNING OPERATIONS

[75] Inventor: Thomas Hedlund, Gastrike-Hammarby, Sweden

[73] Assignee: Sandvik AB, Sandviken, Sweden

[21] Appl. No.: 53,425

[22] Filed: Apr. 28, 1993

[30] Foreign Application Priority Data

Apr. 28, 1992 [SE] Sweden .................. 9201323-4

[51] Int. Cl.⁵ ................. B23B 27/08; B23B 29/14
[52] U.S. Cl. ................................. 407/110; 407/117
[58] Field of Search ............... 82/158; 407/107, 108, 407/109, 110, 111, 117

[56] References Cited

U.S. PATENT DOCUMENTS 5,054,967 10/1991 Noguchi et al. ................ 407/110
5,076,738 12/1991 Pano et al. ...................... 407/110

FOREIGN PATENT DOCUMENTS 0291933 11/1988 European Pat. Off. .
0417862 3/1991 European Pat. Off. .

Primary Examiner—William E. Terrell
Attorney, Agent, or Firm—Burns, Doane, Swecker & Mathis

[57] ABSTRACT

A cut-off tool includes a plate-like holder and a cutting insert retained by a clamping arm. The insert has on its underside a V-shaped groove cooperating with a ridge of analogous V-shape on the holder plate. The V-groove has two flank surfaces extending at an obtuse angle to each other. The male edge or V-ridge similarly has two flank sides, each of which is broken by a break line so as to form two part surfaces, the inner part surfaces, located closest to the central portion of the V-ridge, enclosing an obtuse angle which is, on the one hand, greater than the corresponding obtuse angle between the outer two part surfaces and, on the other hand, smaller than the obtuse angle between the flank surfaces of the V-groove.

13 Claims, 4 Drawing Sheets

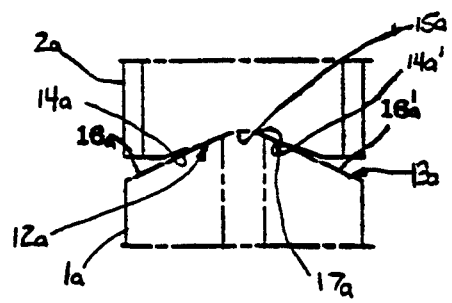
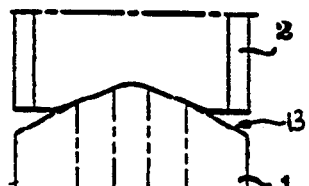
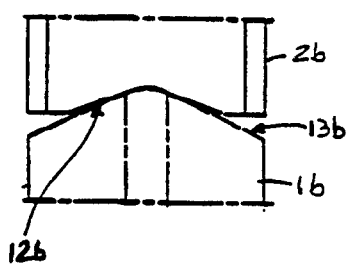
Fig 5     Fig 7     Fig 9
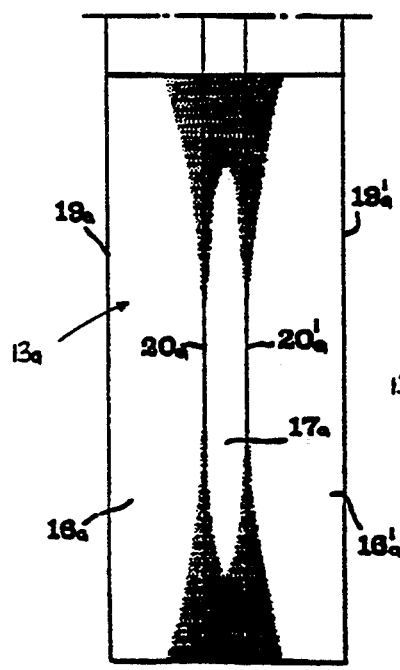
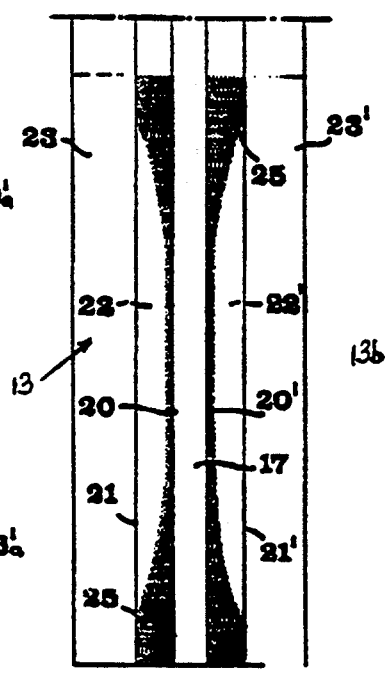
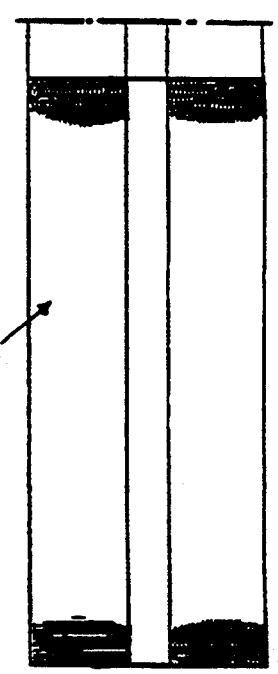
Fig 6     Fig 8     Fig 10

TOOL FOR CUT-OFF OR SIMILAR TURNING OPERATIONS

FIELD OF THE INVENTION

This invention relates to a tool for cut-off or similar turning operations.

BACKGROUND

A cut-off tool of the general type with which the present invention is concerned is previously known from SE 8601533-6 (Publ. No. 452,713). In this prior-art tool, the individual V-groove in the insert, as well as the V-ridge on the tool part cooperating therewith, is designed with, at least theoretically, planar flank surfaces, the obtuse angle between the flank surfaces of the V-groove being about 140° and the corresponding angle between the flank surfaces of the V-ridge on the tool part being about 130°. Accordingly, the clearance angle between each flank surface of the V-ridge and the cooperating flank surface of the groove is about 5°, measured from the line along which the surfaces contact each other. In practice, the contact between the flank surfaces or flank sides of the groove and of the V-ridge is seldom a true line contact. After a varying period of use of the tool, the steel of the holder plate (which is considerably softer than the cemented carbide of the insert) allows, by plastic deformation, a certain "settling" of the insert relative to the flank sides of the V-ridge, such that a certain, in itself not adverse surface contact arises (however still only in the vicinity of the theoretical contact line). This surface contact presupposes that the insert on its cross-sectionally V-shaped underside is essentially straight in its longitudinal extent. In actual practice, however, this is not always the case. Thus, after compacting and sintering of the series-produced cemented carbide inserts, there may be considerable variation between, on the one hand, almost completely straight inserts (underside concavity less than 0.01 mm) to clearly concave inserts (concavity 0.05–0.08 mm). In the last-mentioned inserts, the flank surfaces of the V-groove almost completely lose contact with the corresponding flank surfaces of the V-ridge in its central area and surface or line contact is achieved only in the immediate vicinity of the two opposite ends of the insert. This is quite unsatisfactory, in that there is an imminent risk of chipping and crack formation in the insert.

To overcome the above-mentioned risk, it is conceivable per se to scrap all clearly concave inserts in the same way as is regularly done with inserts having convex undersides. However, the proportion of concave inserts in a series may be considerable, for which reason such scrapping would entail substantial economic losses.

SUMMARY OF THE INVENTION

The present invention is directed to overcoming the foregoing problems and others and toward improving, in a simple manner, the conditions for a completely reliable use of cemented carbide inserts having concave undersides. A basic object of the invention is, thus, to provide a cut-off tool having a V-groove or V-grooves, which groove or grooves determine the position of the insert and are capable of compensating for at least minor tolerance deviations in different inserts and of ensuring optimum engagement or contact surfaces between the insert and the tool.

In accordance with one aspect of the present invention, a tool for cut-off or similar turning operations is provided. The tool is of the type comprising a holder in the form of a comparatively thin plate-like part of a first material, e.g., steel, and a cutting insert of a second, harder material, such as cemented carbide. The holder plate has, in at least one free end thereof, an outwardly opening recess for receiving the insert. The recess is substantially defined by a bottom wall, an inner or rear wall and an upper wall which is part of an elastically movable clamping arm formed in the plate. The clamping arm serves to retain the insert in the recess. The insert has, at least on its underside, a female groove of substantially V-shaped cross-section, which is designed to cooperate with a male ridge or cam of analogous V-shaped cross-section formed in the bottom wall of the recess. The V-groove has two flank surfaces extending at an obtuse angle to each other and being separated by a central portion concavely rounded in cross-section and having a curvature or diameter which is smaller than an analogously, although convexly rounded, central portion which separates two flank sides on the cooperating V-ridge. The smaller curvature or diameter of the central portion of the V-groove provides a clearance between the central portions of the groove and the V-ridge.

BRIEF DESCRIPTION OF THE DRAWINGS

The present invention can be further understood with reference to the following description in conjunction with the appended drawings, wherein like elements are provided with the same reference numerals.

FIG. 5 is a cross-sectional view of a lower portion of an insert and a subjacent tool part according to the prior art;

FIG. 6 is a top plan view of the tool part of FIG. 5;

FIG. 7 is a cross-sectional view of a lower portion of an insert and a subjacent tool part according to an embodiment of the present invention;

FIG. 8 is a top plan view of the tool part of FIG. 7;

FIG. 9 is a cross-sectional view of a lower portion of an insert and a subjacent tool part according to the prior art;

FIG. 10 is a top plan view of the tool part of FIG. 9;

DETAILED DESCRIPTION OF THE PREFERRED EMBODIMENT

Figure 1:
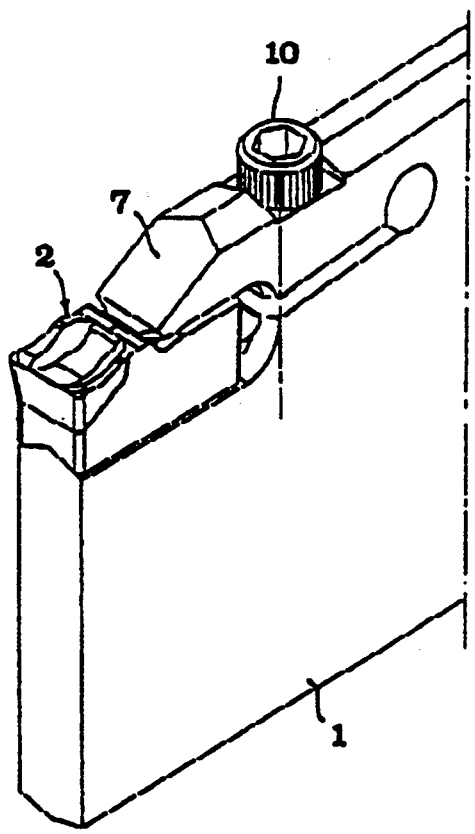
FIG. 1 is a partial perspective view of a tool with an with an insert mounted thereon, according to an embodiment of the invention.
Figure 2:
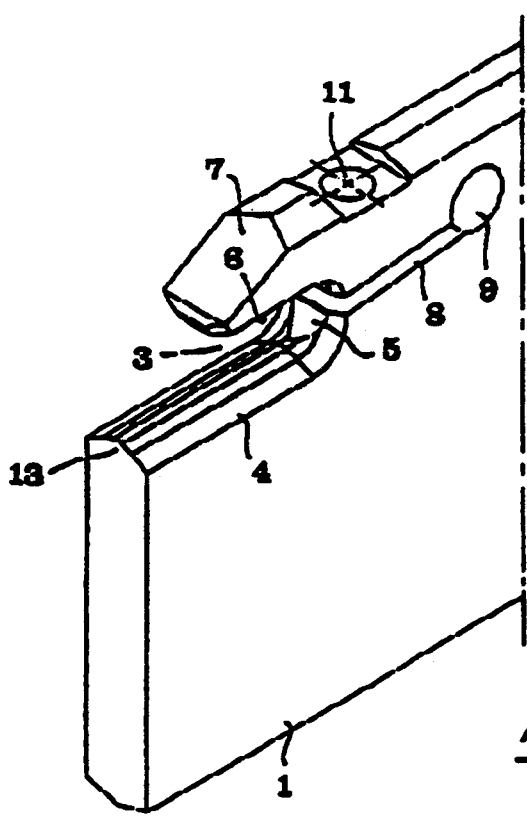
FIG. 2 is a perspective view of a tool, with no insert, according to an embodiment of the invention.

FIGS. 1 and 2 illustrate a tool holder according to an embodiment of the present invention in the form of a comparatively thin plate or plate-like part 1, which may in itself form an independent tool or be part of a tool which also comprises a shank extending transversely of the plate. The holder plate 1 is preferably made of steel. At the left-hand end of the plate 1 in FIGS. 1 and 2, there is provided a recess 3 which opens outwardly and is intended for receiving a cutting insert 2. The recess 3 is substantially defined by a bottom wall 4, an inner or rear wall 5, and an upper wall 6 which is part of an elastically movable clamping arm 7 formed in the plate 1. From the rear wall 5 extends a comparatively narrow slot 8 ending in a hole 9 which extends through the plate 1 and whose diameter is larger than the height of the slot. The arm 7 serves to clamp the insert 2 against the bottom wall 4, to which end there is provided a clamping screw 10 passing through a substantially vertical hole 11 in the clamping arm and engaging a threaded hole formed in the plate under the slot 8. By the inherent elasticity of the steel material, the clamping arm 7, defined by the slot 8, is elastically pivotable and firmly clamps the insert by tightening the screw with a suitable torque.

Figure 3:
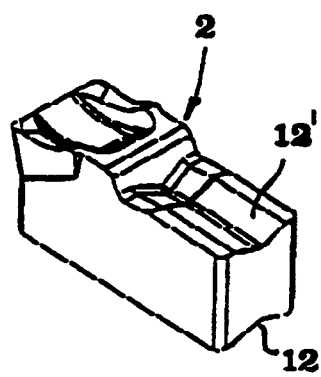
FIG. 3 is a perspective view of an insert according to an embodiment of the invention.

With reference to FIG. 3, the insert 2, consisting of cemented carbide, has on its underside a groove 12, which is V-shaped in cross-section and which cooperates with a cam or V-ridge 13, having a substantially V-shaped cross-section, which forms or is part of the bottom wall 4 of the recess 3, seen in FIG. 2. As seen with reference to FIG. 4, the V-groove 12 in the underside of the insert is defined by two planar flank surfaces 14, 14' which are separated from each other by a central portion 15 concavely rounded in cross-section. This central portion 15 is suitably centrally located in the insert 2. An obtuse angle $\alpha$ between the flank surfaces of the V-groove 12 may amount to 140°, although both larger and smaller obtuse angles are conceivable. The V-ridge 13, cooperating with the V-groove 12, similarly has two flank sides, generally designated 16, 16', which are separated by a convexly rounded central portion 17. This convexly rounded central portion 17 has a larger radius of curvature than the concavely rounded central portion 15 in the V-groove 12, whereby to form between these portions a clearance space 18 of substantially crescent-shaped cross-section.

Reference is now made to FIGS. 5 and 6, which illustrate the design of the V-shaped ridge 13a in prior-art cut-off tools (see, e.g., SE 8601533-6). According to the prior art, the two flank sides 16a, 16a' of the V-ridge 13a consist of two completely planar surfaces which extend from the outer edges 19a, 19a' to the break lines 20a, 20a' defining the convexly rounded central portion 17a. The obtuse angle between these two planar surfaces 16a, 16a' generally is about 10° less than the obtuse angle $\alpha$ between the flank surfaces 14a, 14a' of the V-groove 12a (if $\alpha$ = 140°, the angle is 130°), which means that the angular difference or the clearance angle between each flank surface 14a, 14a' in the V-groove 12a and the corresponding flank surface 16a, 16a' on the V-ridge 13a is about 5°. The clearance between these flank surfaces starts at each break line 20a and 20a'. The clearance angle is relatively large, which means that the space between cooperating flank surfaces of the insert and of the V-ridge 13a increases quite dramatically immediately outside the respective break line. If, in manufacture, the insert 2a happens to be designed with an underside 12a having a concavely curved shape in the longitudinal direction, the underside of the insert will engage the underlying V-ridge 13a substantially in the area shown by the shadings in FIG. 6, i.e., only along extremely narrow, longitudinal surface areas in the immediate vicinity of the center of the V-ridge 13a. At the front edge and the rear edge of the V-ridge 13a, the clearance space 18 disappears and the rounded central portions 15a and 17a are in contact with each other. This contact is not adverse in itself in cut-off operations, i.e. when the feed direction of the tool is parallel to the center line of the plate 1. However, when the feed direction is changed so as to become perpendicular to the center line, the contact or engagement surfaces become too small with a consequential, manifest risk of plastic deformation of the V-ridge 13a. This, in turn, may give rise to instability of the insert 2a and an undesired angular deviation thereof. Also, the plastic deformation results in a lowering of the cutting edge line. This condition is, of course, not satisfactory.

Figure 4:
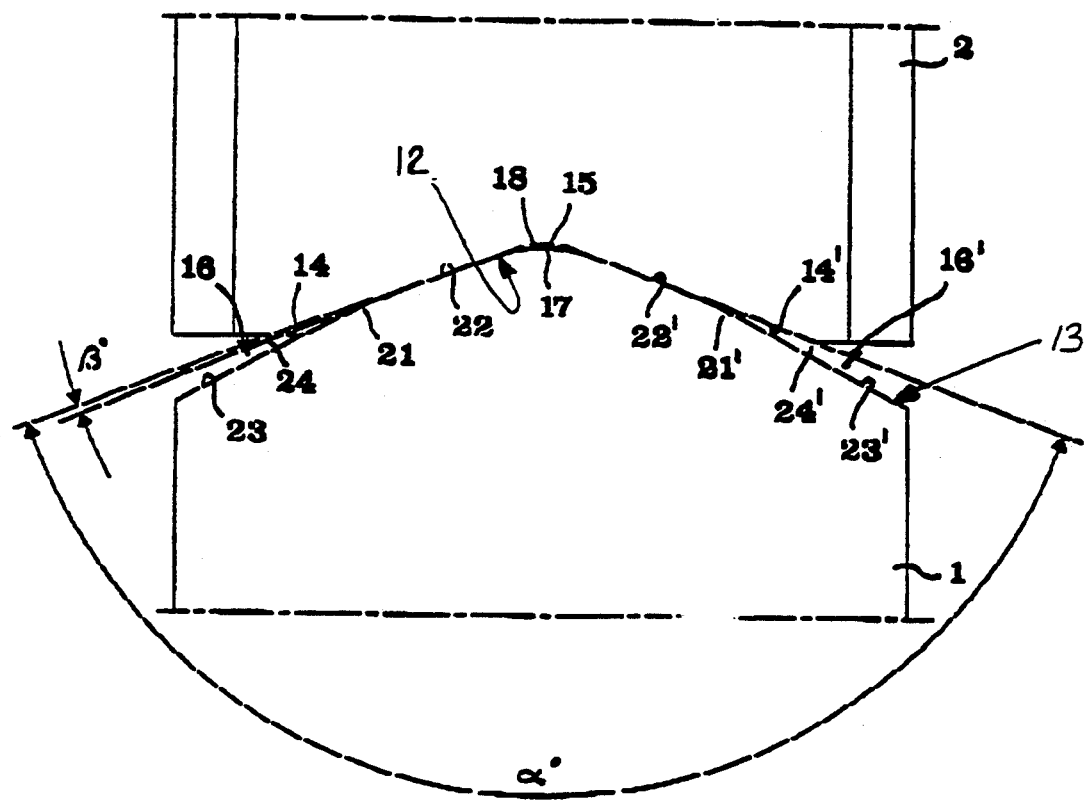
FIG. 4 is a cross-sectional view, on an exaggerated scale, of the lower portion of an insert and the upper portion of a subjacent part of a tool according to an embodiment of the invention.

Reference is now made to FIGS. 7 and 8, which illustrate how each of the two flank sides 16, 16' of the V-ridge 13 according to the invention are divided by break lines 21, 21' into inner and outer part surfaces 22, 22' and 23, 23' respectively (see also the enlarged cross-section in FIG. 4). Now, assuming that the obtuse angle between the outer part surfaces 23, 23' is maintained at, e. g., 130°, as in conventional tools, the divided or broken flank sides 16, 16' are so designed that the obtuse angle between the inner part surfaces 22, 22' becomes considerably larger, suitably only slightly smaller than the obtuse angle $\alpha$ between the flank surfaces 14, 14' of the V-groove 12. Advantageously, the divided or broken flank sides 16, 16' of the V-ridge 13 are so designed that the angular difference or clearance angle $\beta$ between each inner part surface 22, 22' and an associated flank surface 14 and 14' respectively, in the V-groove 12 of the insert 2 is in the range of 0.1°–2°, suitably 0.5°–1.5°, while the corresponding angular difference between those V-groove flank surfaces and an outer part surface 23 and 23' respectively, is in the range of 3°–10°, suitably 4°–6°. The size of the inner, active part surfaces 22, 22' is suitably such that the distance between the two break lines 21, 21' defining these surfaces from the outer part surfaces is 0.6–0.8 times, suitably about 0.7 times the width of the V-groove 12 counted as the distance between the break lines or boundary edges 24, 24' of the V-groove.

In other words, according to the present invention, a space or clearance (which, prior to the present invention, increased quite dramatically) between the individual flank surfaces 14, 14' in the V-groove 12 and the corresponding flank surfaces 16, 16' of the V-ridge 13 (clearance angle approximately 5°) in the divided or broken flank side design according to FIGS. 7 and 8 is filled to a major extent with material, such that the respective flank surfaces are located considerably closer to each other (clearance angle about 1°). This means that even a relatively small plastic deformation in the steel material of the V-ridge 13 is sufficient for providing contact with the concave underside 12 of an insert 2 over considerably longer surface area, as illustrated by the shading 25 in FIG. 8. In this manner, also such inserts 2 as have undersides of more or less concavely curved shape will engage the subjacent V-ridge 13 in a satisfactory manner, such that the risk of chipping of the insert is minimized.

In this context, it should be pointed out that it is not permissible, for basic constructional reasons, to provide an engagement of the insert 2 with the V-ridge 13 in contact points located too far away from the center of the insert, for the insert may then be subjected to forces tending to crack it in the area of its center. This phenomenon is illustrated in FIGS. 9 and 10, of which FIG. 10 shows how the short contact surfaces at the opposite ends of a concave insert 2b extend as far as the edges of the long sides of the bottom surface 4b. This constructional limitation means that the above-mentioned V-ridge 13b cannot be designed only with simple planar surfaces having a small clearance angle in relation to the flank surfaces of the V-groove 12b, and so, the object of the invention can only be solved by designing the two flank sides of the V-ridge with divided or broken part surfaces, as described above.

Although the invention has been described above only with respect to the V-groove 12 provided in the underside of the insert 2, it should be pointed out that the insert generally has a corresponding V-groove 12' on its upper side, the upper V-groove cooperating (not visible in the drawings) with a V-ridge or cam of V-shaped cross-section on the underside of the clamping arm 7. The inventive design of the V-ridge with divided or broken part surfaces is also applicable to such an upper V-ridge on the underside of the clamping arm 7. Thus, in the manufacture of the inventive tool it is possible to use one and the same form cutter for providing both lower and upper V-ridges at the insert-receiving recess 3.

Figure 11:
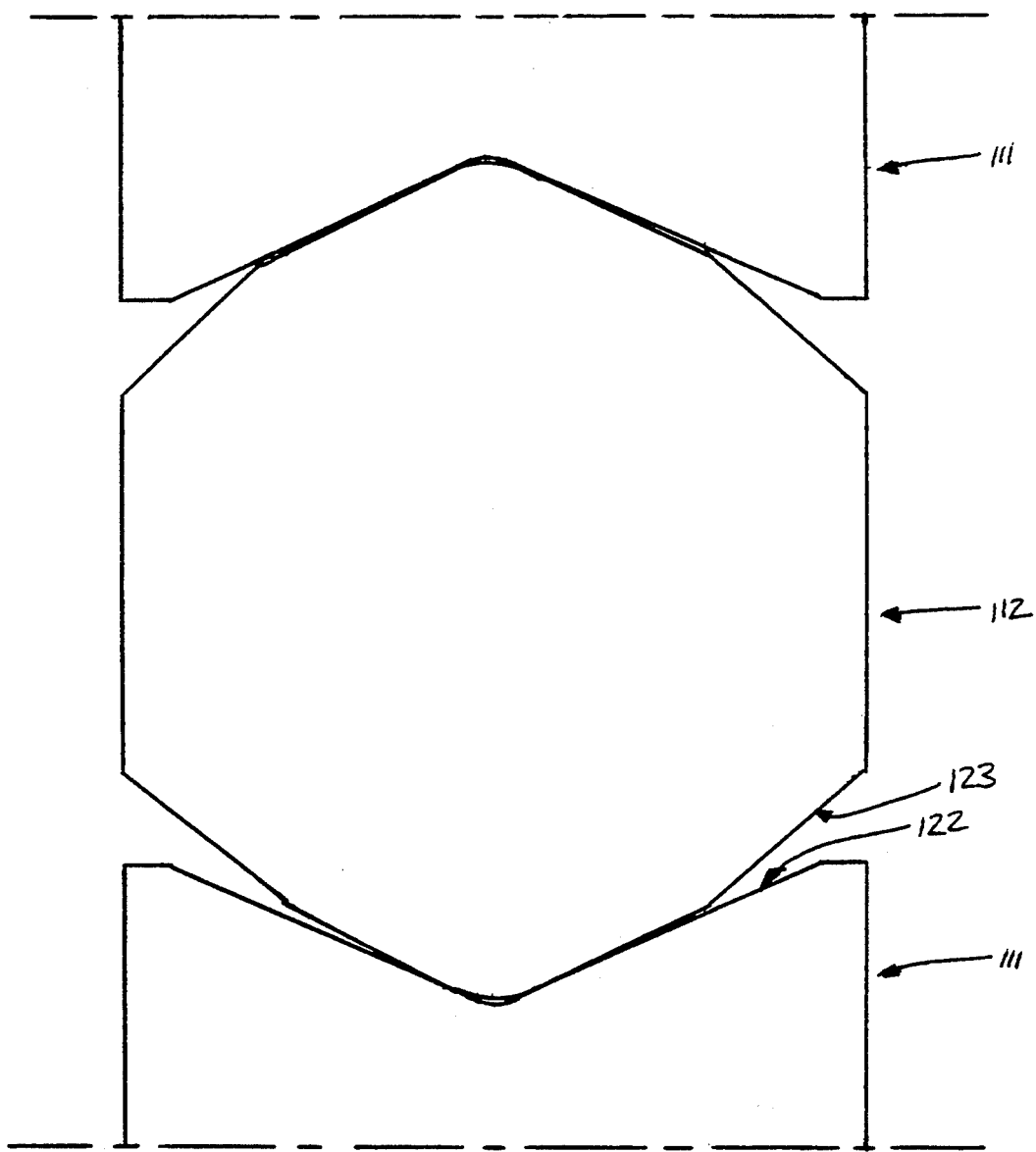
FIG. 11 is a cross-sectional view, on an exaggerated scale, of an insert and a tool according to a further embodiment of the present invention.

Another embodiment of the tool holder according to the present invention is seen with reference to FIG. 11. The tool holder includes a thin plate holder plate 111 and a cutting insert 112 similar to the plate 1 and insert 2 discussed above, except that a V-shaped groove 122 is formed on a bottom wall of the recess of the cutting tool and a V-shaped ridge 123 is formed on an underside of the insert 112.

While this invention has been illustrated and described in accordance with a preferred embodiment, it is recognized that variations and changes may be made therein without departing from the invention as set forth in the claims.

What is claimed is:

1. A tool for cut-off or similar turning operations, comprising:
    a holder in the form of a comparatively thin plate, the holder plate having, in at least one free end thereof, an outwardly opening recess, the recess being substantially defined by a bottom wall, an inner or rear wall and an upper wall which is part of an elastically movable clamping arm formed in the plate; and
    a cutting insert, the cutting insert being receivable in the recess of the holder and retainable by the elastically movable clamping arm, the insert having, at least on its underside, a female groove of substantially V-shaped cross-section, the V-shaped groove corresponding to a V-shaped ridge formed in the bottom wall of the recess, the V-shaped groove having two flank surfaces extending at an obtuse angle to each other and being separated by a concavely rounded central portion having a curvature or diameter which is smaller than a corresponding, convexly rounded central portion which separates two flank sides on the V-shaped ridge so as to form a clearance between the central portions of the V-shaped groove and the V-shaped ridge,
    each of the two flank sides on the V-shaped ridge of the bottom wall being provided with a break line so as to form inner and outer part surfaces on each flank side, the two inner part surfaces located closest to the central portion of the V-shaped ridge enclosing an obtuse angle greater than a corresponding obtuse angle between the two outer part surfaces and smaller than the obtuse angle between the flank surfaces of the V-shaped groove.

2. A tool as claimed in claim 1, wherein the obtuse angle between the inner part surfaces is closer in size to the obtuse angle between the two flank surfaces of the V-shaped groove than the obtuse angle between the inner part surfaces is to the obtuse angle between the two outer part surfaces.

3. A tool as claimed in claim 2, wherein an angular difference between each inner part surface and a cooperating one of the flank surfaces in the V-shaped groove of the insert is in the range of 0.1°–2°.

4. A tool as claimed in claim 2, wherein an angular difference between each inner part surface and a cooperating one of the flank surfaces in the V-shaped groove of the insert is in the range of 0.5°–1.5°.

5. A tool as claimed in claim 3, wherein an angular difference between each outer part surface and the cooperating one of the flank surfaces of the V-shaped groove is in the range of 3°–10°.

6. A tool as claimed in claim 3, wherein an angular difference between the each outer part surface and the cooperating one of the flank surfaces of the V-shaped groove is in the range of 4°–6°.

7. A tool as claimed in claim 2, wherein an angular difference between each outer part surface and a cooperating one of the flank surfaces of the V-shaped groove is in the range of 3°–10°.

8. A tool as claimed in claim 2, wherein an angular difference between each outer part surface and a cooperating one of the flank surfaces of the V-shaped groove is in the range of 4°–6°.

9. A tool as claimed in claim 1, wherein a distance between the two break lines delimiting the inner part surfaces from the outer part surfaces is 0.6–0.8 times the width of the V-shaped groove, measured as the distance between lower boundary edges of the flank surfaces of the V-shaped groove.

10. A tool as claimed in claim 1, wherein a distance between the two break lines delimiting the inner part surfaces from the outer part surfaces is 0.7 times the width of the V-shaped groove, measured as the distance between lower boundary edges of the flank surfaces of the V-shaped groove.

11. A tool as claimed in claim 1, wherein the holder is made of steel, and the insert is made of a material having greater hardness than steel.

12. A tool as claimed in claim 11, wherein the insert is made of cemented carbide.

13. A tool for cut-off or similar turning operations, comprising:
    a holder in the form of a comparatively thin plate, the holder plate having, in at least one free end thereof, an outwardly opening recess, the recess being substantially defined by a bottom wall, an inner or rear wall and an upper wall which is part of an elastically movable clamping arm formed in the plate; and
    a cutting insert, the cutting insert being receivable in the recess of the holder and retainable by the elastically movable clamping arm,
    the bottom wall of the recess being formed with a female groove of substantially V-shaped cross-section, the V-shaped groove corresponding to a V-shaped ridge formed on an underside of the insert, the V-shaped groove having two flank surfaces extending at an obtuse angle to each other and being separated by a concavely rounded central portion having a curvature or diameter which is smaller than a corresponding, convexly rounded central portion which separates two flank sides on the V-shaped ridge so as to form a clearance between the central portions of the V-shaped groove and the V-shaped ridge, and each of the two flank sides on the V-shaped ridge of the bottom wall being provided with a break line so as to form inner and outer part surfaces on each flank side, the two inner part surfaces located closest to the central portion of the V-shaped ridge enclosing an obtuse angle greater than a corresponding obtuse angle between the two outer part surfaces and smaller than the obtuse angle between the flank surfaces of the V-shaped groove.

* * * * *